US012689606B2

(12) United States Patent
Kaizer et al.

(10) Patent No.: US 12,689,606 B2
(45) Date of Patent: Jul. 21, 2026

(54) DECENTRALIZED IDENTIFIER DETERMINATION BY A REGISTRY OPERATOR OR REGISTRAR

(71) Applicant: Verisign, Inc., Reston, VA (US)

(72) Inventors: Andrew Kaizer, Arlington, VA (US); Swapneel Sheth, Fairfax, VA (US)

(73) Assignee: VeriSign, Inc., Reston, VA (US)

( * ) Notice: Subject to any disclaimer, the term of this patent is extended or adjusted under 35 U.S.C. 154(b) by 0 days.

(21) Appl. No.: 18/238,411

(22) Filed: Aug. 25, 2023

(65) Prior Publication Data

US 2023/0403254 A1 Dec. 14, 2023

(51) Int. Cl.
*H04L 61/3015* (2022.01)
*H04L 61/4511* (2022.01)
*H04L 101/618* (2022.01)

(52) U.S. Cl.
CPC ...... *H04L 61/3025* (2013.01); *H04L 61/4511* (2022.05); *H04L 2101/618* (2022.05)

(58) Field of Classification Search
None
See application file for complete search history.

(56) References Cited

U.S. PATENT DOCUMENTS

| | | | |
|---|---|---|---|
| 11,533,161 B1 | 12/2022 | Fregly et al. | |
| 12,316,610 B1 | 5/2025 | Muth et al. | |
| 2007/0106612 A1* | 5/2007 | O'Brien | G06Q 20/40 |
| | | | 705/44 |

| | | | |
|---|---|---|---|
| 2017/0195286 A1* | 7/2017 | Stahura | H04L 61/302 |
| 2019/0068608 A1* | 2/2019 | Boland | H04L 63/123 |
| 2019/0230092 A1* | 7/2019 | Patel | G06F 16/907 |
| 2019/0333054 A1* | 10/2019 | Cona | H04L 9/3297 |
| 2020/0162424 A1* | 5/2020 | Waldron | H04L 69/04 |
| 2020/0296102 A1* | 9/2020 | Buchner | H04L 63/0884 |
| 2020/0296140 A1* | 9/2020 | Buchner | H04L 9/50 |
| 2021/0058403 A1* | 2/2021 | Murdoch | H04L 63/08 |
| 2021/0092019 A1* | 3/2021 | Fang | H04L 43/0876 |
| 2022/0385645 A1* | 12/2022 | Murdoch | G06F 16/2379 |
| 2023/0403154 A1 | 12/2023 | Kaizer | |
| 2024/0372827 A1 | 11/2024 | Hsu | |

FOREIGN PATENT DOCUMENTS

WO WO-2019143580 A1 * 7/2019 ....... G06F 16/24578

OTHER PUBLICATIONS

Decentralized Identifiers (DIDs) v1.0, Core architecture, data model, and representations; W3C Recommendation; Jul. 19, 2022; retrieved from https://www.w3.org/TR/did-core/; 110 pages.

(Continued)

*Primary Examiner* — Phyllis A Book
(74) *Attorney, Agent, or Firm* — Lee & Hayes, P.C.

(57) ABSTRACT

Techniques for identifying a registrant of a domain name using a decentralized identifier are described herein. A computing device can determine a decentralized identifier (DID) for associating with the domain name and validate an identity of the registrant based on the decentralized identifier. The computing device can be associated with a registrar or a registry operator that uses the decentralized identifier during registration of a domain name and/or to perform operations after the domain name is registered. The computing device can use the decentralized identifier in place of personal information to identify the domain name.

20 Claims, 6 Drawing Sheets

(56)         References Cited

OTHER PUBLICATIONS

ICANN 76 CANCUN DID to DNS with DNSSEC; CIRA presented on Mar. 15, 2023; 22 pages.
Verifiable Credentials Data Model v1.1; W3C Recommendation; Mar. 3, 2022; https://www.w3.org/TR/vc-data-model/; 127 pages.
Office Action for U.S. Appl. No. 18/238,416, dated Apr. 24, 2025, 11 Pages.

* cited by examiner

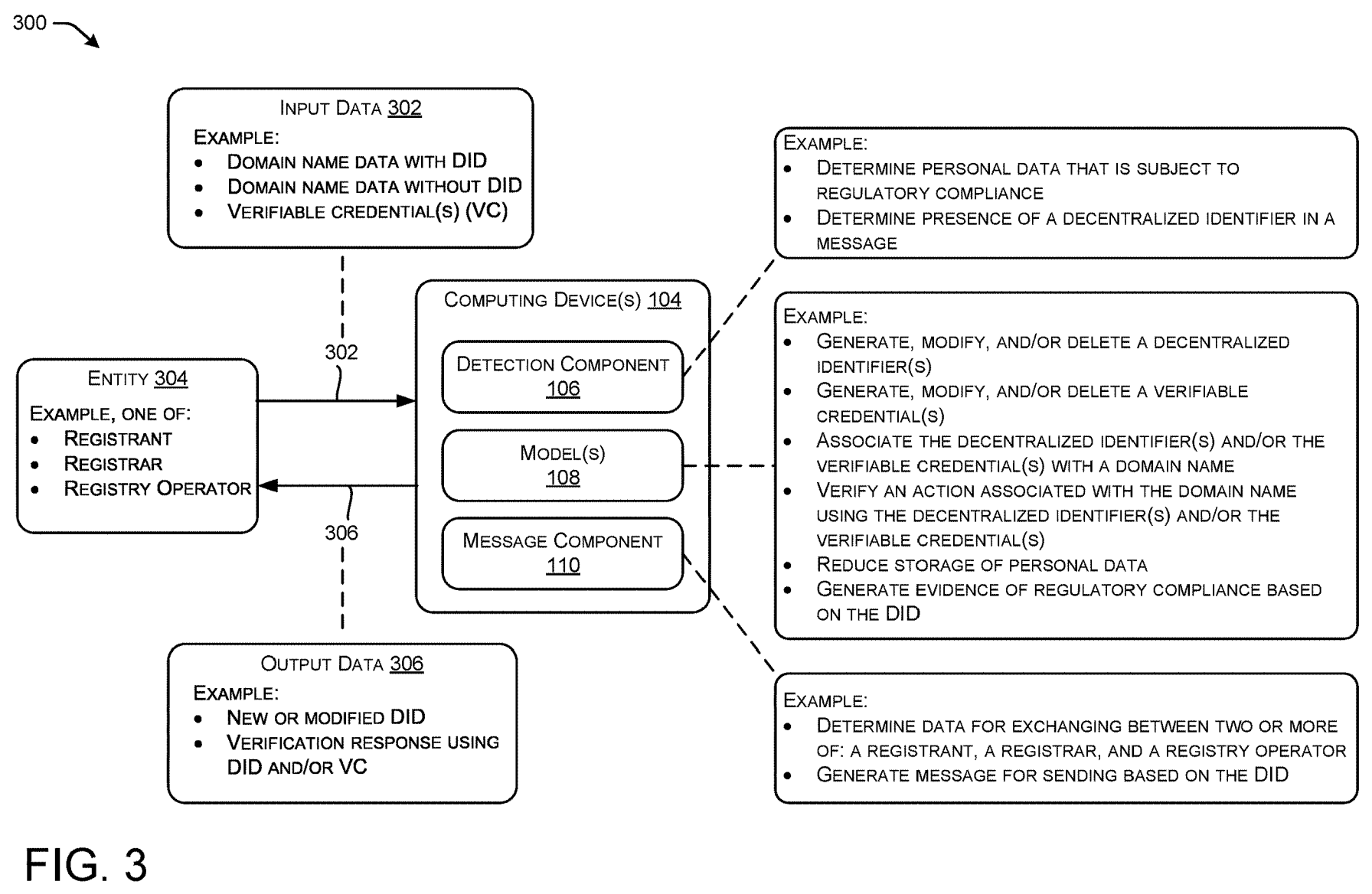

300

EXAMPLE:
- DETERMINE PERSONAL DATA THAT IS SUBJECT TO REGULATORY COMPLIANCE
- DETERMINE PRESENCE OF A DECENTRALIZED IDENTIFIER IN A MESSAGE

EXAMPLE:
- GENERATE, MODIFY, AND/OR DELETE A DECENTRALIZED IDENTIFIER(S)
- GENERATE, MODIFY, AND/OR DELETE A VERIFIABLE CREDENTIAL(S)
- ASSOCIATE THE DECENTRALIZED IDENTIFIER(S) AND/OR THE VERIFIABLE CREDENTIAL(S) WITH A DOMAIN NAME
- VERIFY AN ACTION ASSOCIATED WITH THE DOMAIN NAME USING THE DECENTRALIZED IDENTIFIER(S) AND/OR THE VERIFIABLE CREDENTIAL(S)
- REDUCE STORAGE OF PERSONAL DATA
- GENERATE EVIDENCE OF REGULATORY COMPLIANCE BASED ON THE DID

EXAMPLE:
- DETERMINE DATA FOR EXCHANGING BETWEEN TWO OR MORE OF: A REGISTRANT, A REGISTRAR, AND A REGISTRY OPERATOR
- GENERATE MESSAGE FOR SENDING BASED ON THE DID

COMPUTING DEVICE(S) 104

DETECTION COMPONENT 106

MODEL(S) 108

MESSAGE COMPONENT 110

INPUT DATA 302

EXAMPLE:
- DOMAIN NAME DATA WITH DID
- DOMAIN NAME DATA WITHOUT DID
- VERIFIABLE CREDENTIAL(S) (VC)

302

ENTITY 304

EXAMPLE, ONE OF:
- REGISTRANT
- REGISTRAR
- REGISTRY OPERATOR

306

OUTPUT DATA 306

EXAMPLE:
- NEW OR MODIFIED DID
- VERIFICATION RESPONSE USING DID AND/OR VC

FIG. 3

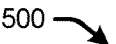

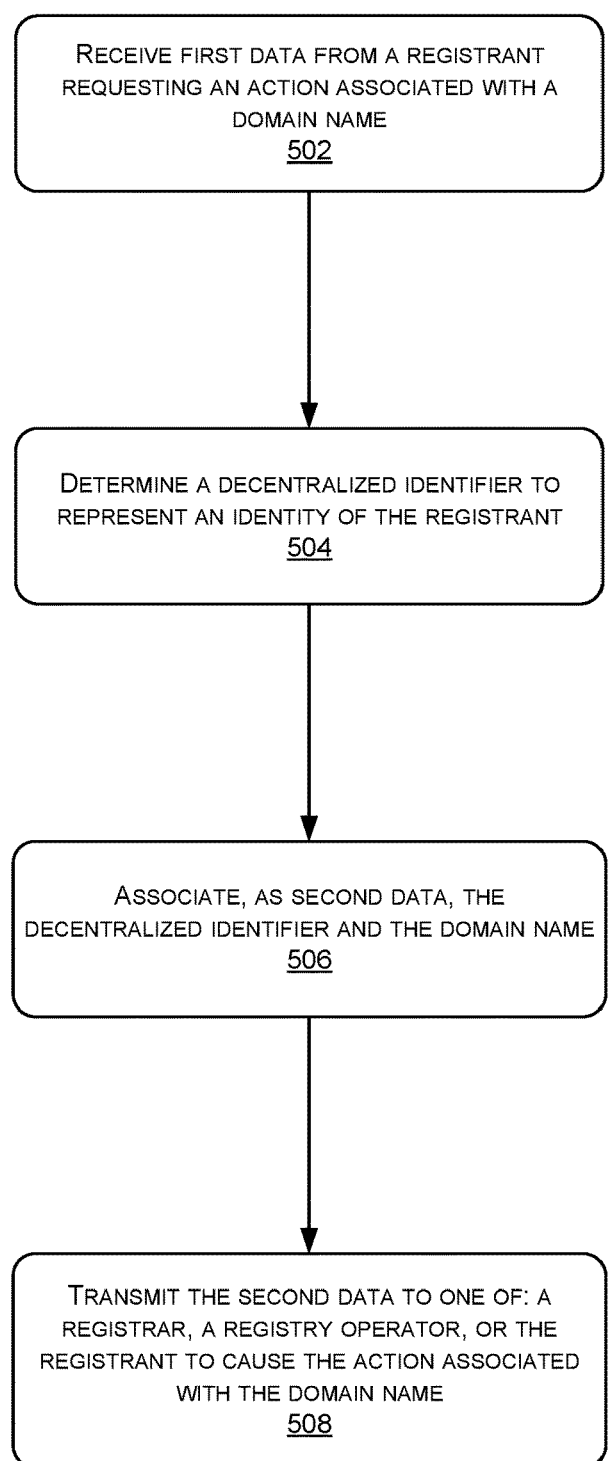

500

RECEIVE FIRST DATA FROM A REGISTRANT
REQUESTING AN ACTION ASSOCIATED WITH A
DOMAIN NAME
502

DETERMINE A DECENTRALIZED IDENTIFIER TO
REPRESENT AN IDENTITY OF THE REGISTRANT
504

ASSOCIATE, AS SECOND DATA, THE
DECENTRALIZED IDENTIFIER AND THE DOMAIN NAME
506

TRANSMIT THE SECOND DATA TO ONE OF: A
REGISTRAR, A REGISTRY OPERATOR, OR THE
REGISTRANT TO CAUSE THE ACTION ASSOCIATED
WITH THE DOMAIN NAME
508

DECENTRALIZED IDENTIFIER DETERMINATION BY A REGISTRY OPERATOR OR REGISTRAR

BACKGROUND

Registered domain names direct users to content over the Internet. To register a domain name, a registrant provides contact information and payment to a registrar. The registrar can confirm jurisdiction requirements for registering the domain name and interacts with a registry operator that maintains a registry of domain names. The domain name, or storage thereof, can be subject to regulatory compliance to ensure proper handling and storage of contact information associated with the domain name. That is, a government or municipality can provide criteria for storing or registering domain names in a respective jurisdiction. The registrar and/or the registry operator may need to provide evidence that the contact information is properly stored. Further, registering and using domain names requires verifying the contact information provided by the registrant at various steps which requires processor, memory, and network resources. Thus, computational costs associated with storing and processing contact information associated with a domain name prevent such resources from being available for other processing.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 3 illustrates an example block diagram of an example computer architecture for implementing techniques to determine a decentralized identifier for a domain name.

FIG. 5 is a flowchart depicting an example process for associating a decentralized identifier and a domain name.

DETAILED DESCRIPTION

Figure 1:
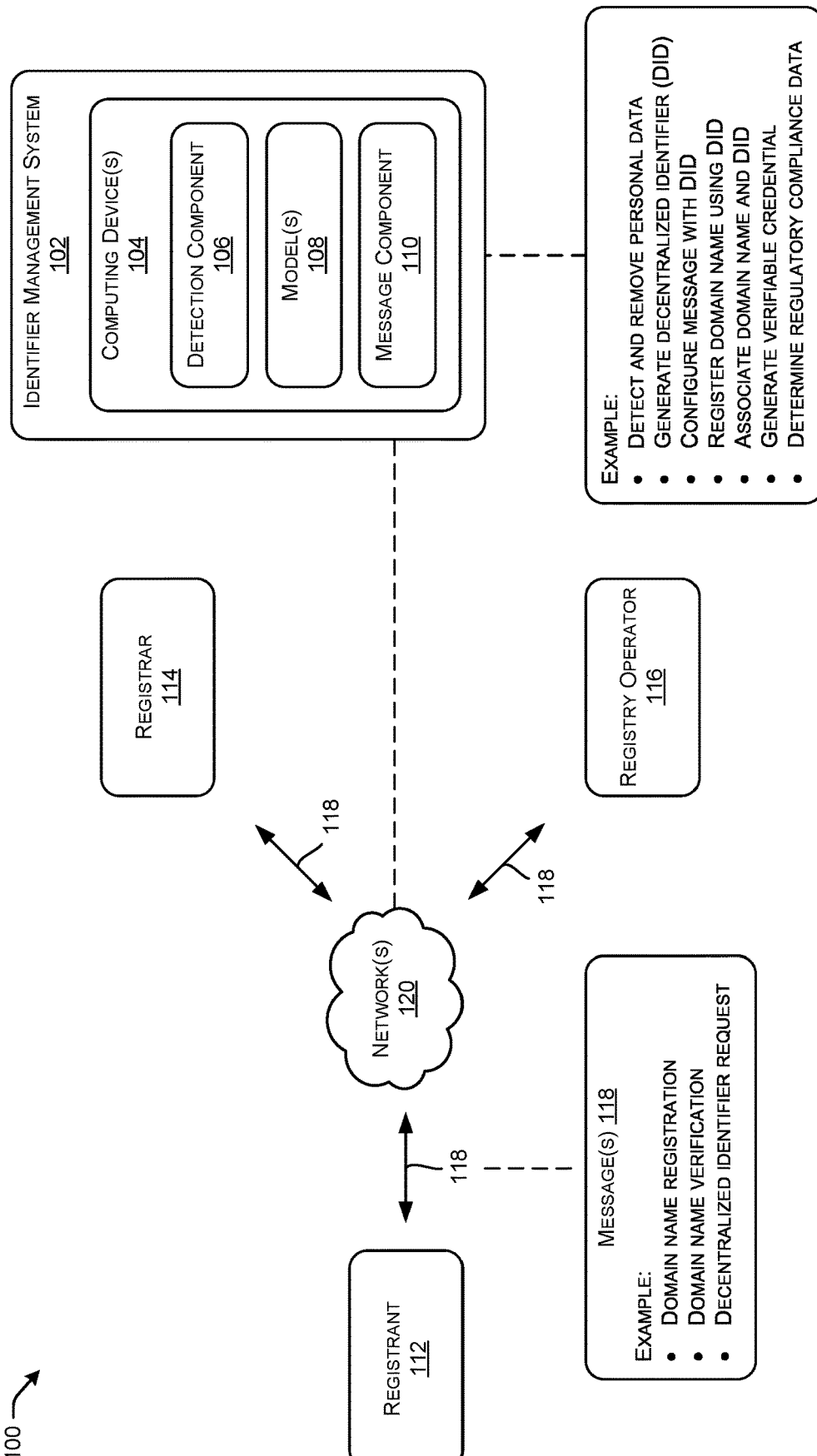
FIG. 1 illustrates a system-architecture diagram of an example environment in which an example identifier management system manages decentralized identifiers.

This application describes techniques for identifying a registrant of a domain name using a decentralized identifier. For example, a computing device can determine a decentralized identifier (DID) for associating with the domain name and validate an identity of the registrant based on the decentralized identifier. In various examples, the computing device can be associated with a registrar or a registry operator that uses the decentralized identifier during registration of a domain name and/or to perform operations after the domain name is registered. By assigning a decentralized identifier to a domain name, the registrar and/or the registry operator can avoid storing or otherwise including personal information about the registrant in data exchanges between two or more of: the registrant, the registrar, and the registry operator.

Using the decentralized identifiers to identify a registrant as described herein enables an entity (e.g., the registrar and/or the registry operator) to manage and store decentralized identifiers instead of personal data (e.g., personal identifiable information (PII)). For example, the entity can utilize a DID to identify the registrant of a particular domain name, store DIDs for multiple registrants, and/or retrieve instructions associated with the DID from a database or registry, just to name a few. Generally, the entity can create, modify, and/or delete DID and domain associations as needed, depending on the example, to manage the use of such DIDs.

In some examples, the entity can implement a computing device that is configured to receive messages having personal data that is subject to regulatory compliance and assign a DID for a registrant associated with the message (e.g., such as during registration of a domain name). For example, the computing device can detect the personal data (e.g., contact information, address, payment information, etc.), assign a DID for the registrant, and use the DID in place of the personal data in subsequent messages (e.g., data exchanges between two or more of the registrant, the registrar, and the registry operator). Additional details for assigning, using, or otherwise determining a DID to identify a domain name are described herein, including in relation to the following figures.

In various examples, the computing device can detect presence of a DID in a message received from a registrant, a registrar, or a registry operator, and perform an action to satisfy a request associated with the message. For example, the computing device can retrieve a decentralized identifier document associated with the DID and cause an action to be performed based on an instruction(s) in the DID document. Example actions can include verifying an identity of the registrant (e.g., to a third-party), confirming ownership of a domain name, verifying credentials issued by a registrant, validating content associated with the domain name, etc. For example, the computing device can generate data that includes the DID for exchange (e.g., transmission) between two or more of: the registrant, the registrar, or the registry operator.

In various examples, the computing device can determine a verifiable credential (VC) to associate with a DID and/or a domain name. The computing device can assign a verifiable credential to serve a variety of functions as part of domain name registration or processing. Generally, the verifiable credential can include one or more of: a subject, a type, an issuing authority, properties asserted by the issuing authority, origin information, constraints (terms of use, expiration date, etc.), just to name a few. A verifiable credential (machine-readable and/or human-readable) may be used to show ownership of a domain name such as proving that a DID is a valid representation for the registrant. In some examples, a holder of a verifiable credential can verify an identity by outputting a verifiable presentation for sharing with a verifier as proof.

The techniques discussed herein can improve functioning of a computing device in a number of ways. For example, the computing device can implement a model or component to generate a decentralized identifier that replaces personal data thereby precluding storage of the personal data by an entity associated with the computing device (e.g., a registrar, a registry operator, etc.). The techniques can include the model of the component optimizing available computational resources by performing operations that limit the impact on the available resources (as compared to not implementing the model). Further, computational resources and network activity associated with storing and processing personal data can be avoided thereby freeing up such computational resources for other use by the computing device. Further, it may be the case that fewer or simpler operations can be performed by the registrar and/or the registry operator to validate an identity versus processing personal data. Functioning of a computing device can also be improved by avoiding use of a registry or memory as a central processing entity for identifiers that can instead be represented using a decentralized identifier and/or a verifiable credential. The techniques can also improve network security by preventing or removing sensitive data from being transmitted over a network, such as in examples when the entity provides proof data as a zero knowledge proof (or other method to prove a statement is true).

The techniques described herein can be implemented in a number of ways. Example implementations are provided below with reference to the following figures. However, the scope of the invention is not limited to these specific examples. Although discussed in the context of a registrar or a registry operator, the methods, apparatuses, and systems described herein can be applied to a variety of systems and is not limited to the registrar and the registry operator.

FIG. 1 illustrates a system-architecture diagram of an example environment 100 in which an example identifier management system manages decentralized identifiers (e.g., to comply with storage and/or handling rules related to private information about a user, registrant, etc.). For instance, an identifier management system 102 can implement one or more computing devices 104 that include a detection component 106, one or more models 108, and a message component 110 to detect, assign, issue, revoke, delete, or otherwise manage decentralized identifiers for processing by a registrant 112, a registrar 114, a registry operator 116, and/or another entity that processes a domain name. For example, a verifier (e.g., an end user/computing device) may also be included in some examples. Domain name system terminology can be defined in a standards document such as in RFC8499 which defines the registrant 112, the registrar 114, and the registry operator 116 (e.g., referred to in RFC8499 as "a registry").

In some examples, the computing device(s) 104 can be associated with one or more of: the registrant 112, the registrar 114, or the registry operator 116. The computing device(s) 104 can be configured to send and/or receive one or more messages 118 (also referred to herein as "the message 118") over a network 120 (e.g., the Internet). The message 118 can be associated with the domain name registration, domain name verification, or a request for a DID, just to name a few. The techniques described herein can be implemented by the registrant 112, the registrar 114, and/or the registry operator 116 depending on the implementation and instructions associated with a particular DID. For example, the identifier management system 102 can implement one or more computing devices 104 to enable a DID to represent a domain name in a DID document accessible by the registrant 112, the registrar 114, and/or the registry operator 116.

In some examples, the computing device(s) 104 can use an Extensible Provisioning Protocol (EPP) to manage the decentralized identifiers. The EPP can provide a data structure that enables for efficient provisioning and management of domain name data in a storage device. In various examples, the EPP can specify how the registrant can authorize information, such as to associate a decentralized identifier with a domain name. Of course, other protocols or data structures can also be used in other examples.

In various examples, the message 118 can include a previously generated DID usable to verify a domain name, etc. while in other examples, the message 118 can include a request to generate a DID for associating with a domain name (e.g., during registration of the domain name or after). In some examples, the message 118 can include personal information required to register a domain name along with a request to use a DID in place of the personal information. The message 118 can, for instance, include personal information to confirm any registration requirements. In some examples, the DID can be generated by the computing device(s) 104 independent of receiving an explicit request for the DID (e.g., the model 108 can initiate generating a new DID in response to receiving personal information in the message 118).

In some examples, the message 118 can represent a response from the identifier management system 102 to a first message requesting to generate or modify a DID. The response can include a new DID or a modified DID, and if configured in the DID document, a verifiable credential usable to share information or invoke various actions.

In various examples, the computing device(s) 104 can implement the detection component 106 to detect presence of a DID and/or personal data associated with the message 118. For example, the detection component 106 can detect personal data (e.g., personal identifiable information) included in the message 118 for removal and substitution using a decentralized identifier. The computing device(s) 104 can implement the model(s) 108 to determine an action associated with the message 118 such as generating a DID responsive to a request from the registrant 112, accessing a DID document associated with the DID, verifying an identity of a sender of the message 118, removing data subject to compliance by an entity, and so on.

Generally, the model(s) 108 can manage (e.g., create, update, modify, and/or delete) DIDs for a variety of domain names. For instance, the model(s) 108 can enable the registrant 112, the registrar 114 and/or the registry operator 116 to register a domain name using a DID in place of personal information. In various examples, the DID can be used by an entity to identify an endpoint associated with the DID to exchange data and request personal information if needed. In some examples, the model(s) 108 can associate the domain name and the DID in a document stored on a storage device, memory, database, etc.

As described herein, the model(s) 108 may be representative of statistical models, heuristic models, or a combination thereof. That is, a model may refer to a statistical model that is representative of logic and/or mathematical functions that generate approximations which are usable to make predictions.

In various examples, the model(s) 108 can determine a verifiable credential to associate with a DID and/or a domain name. The verifiable credential can include a cryptography key to show ownership of a domain name such as proving that a DID is authorized to represent a domain name registered by the registrant 112. The verifiable credential can represent a subject, a type, an issuing authority, properties asserted by the issuing authority, origin information, constraints (terms of use, expiration date, etc.), etc. A verifiable credential may, in some examples, include instructions, that when performed, prove an identity. One example can include a verifier sharing (e.g., outputting for display) a verifiable presentation as proof of a holder of the verifiable credential. Additional discussion of the model(s) 108, the decentralized identifier, and verifiable credentials can be found throughout this disclosure.

By way of example and not limitation, the registrant 112 can send the message 118 to the registrar 114 which implements the detection component 106 to detect a DID in the message. Based at least in part on the detection, the model(s) 108 can access a DID document comprising the rules, criteria, or instructions associated with the DID. The DID document can include further information about the domain name, associations with another identifier, and/or an action(s) to take including, for example, verifying an identity of the registrar 114 sending the message 118.

The computing device(s) 104 can, for instance, store data associated with a domain name and the DID instead of storing personal data. For instance, the model(s) 108 can remove the personal data, assign a DID, and store the DID as proof of the identity of the registrant 112 and to avoid storing personal data that is subject to storage rules (e.g., regulatory compliance, etc.). For example, a governing body (e.g., a group defining a standard) can issue rules for storing personal data and request proof that such rules are being followed. By way of example and not limitation, the General Data Protection Regulation (GDPR) can define regulations for information privacy in the European Union such as giving an end user a right to delete private data. In such examples, the computing device(s) 104 can receive a message 118 requesting proof of proper storage and/or handling of the personal data, and provide the DID as part of a challenge or a proof that the domain name is identifiable without storing personal data (e.g., to provide a challenge or a proof to identify a registrar, domain name, etc.).

The message component 110 can represent functionality to receive, send, generate, or otherwise process messages for implementing the techniques described herein. In some examples, the message component 110 can generate or configure the message 118 to include a decentralized identifier, proof that data is stored, processed, or handled properly, a verifiable credential, and the like. Associating the computing device(s) 104 with the registrar 114 and/or the registry operator 116 enables the registrar 114 and/or the registry operator 116 to process DIDs as part of domain name registration or management.

The network(s) 120 can represent a variety of types of networks such as a blockchain network usable to exchange a bitcoin. For instance, the DID can be associated with a blockchain by assigning a DID method corresponding to an identifier of a particular blockchain (or similar platform for linking records via a cryptographic key. Additional examples of associating a domain name and a blockchain can be found, for example, in U.S. patent application Ser. No. 16/024,488, entitled, "Domain Name Blockchain User Addresses", filed on Jun. 29, 2019, and U.S. patent application Ser. No. 16/402,047 titled "Establishment, Management, and Usage of Domain Name to Blockchain Address Associations" filed May 2, 2019, the entireties of which are herein incorporated by reference for all purposes.

Figure 2:
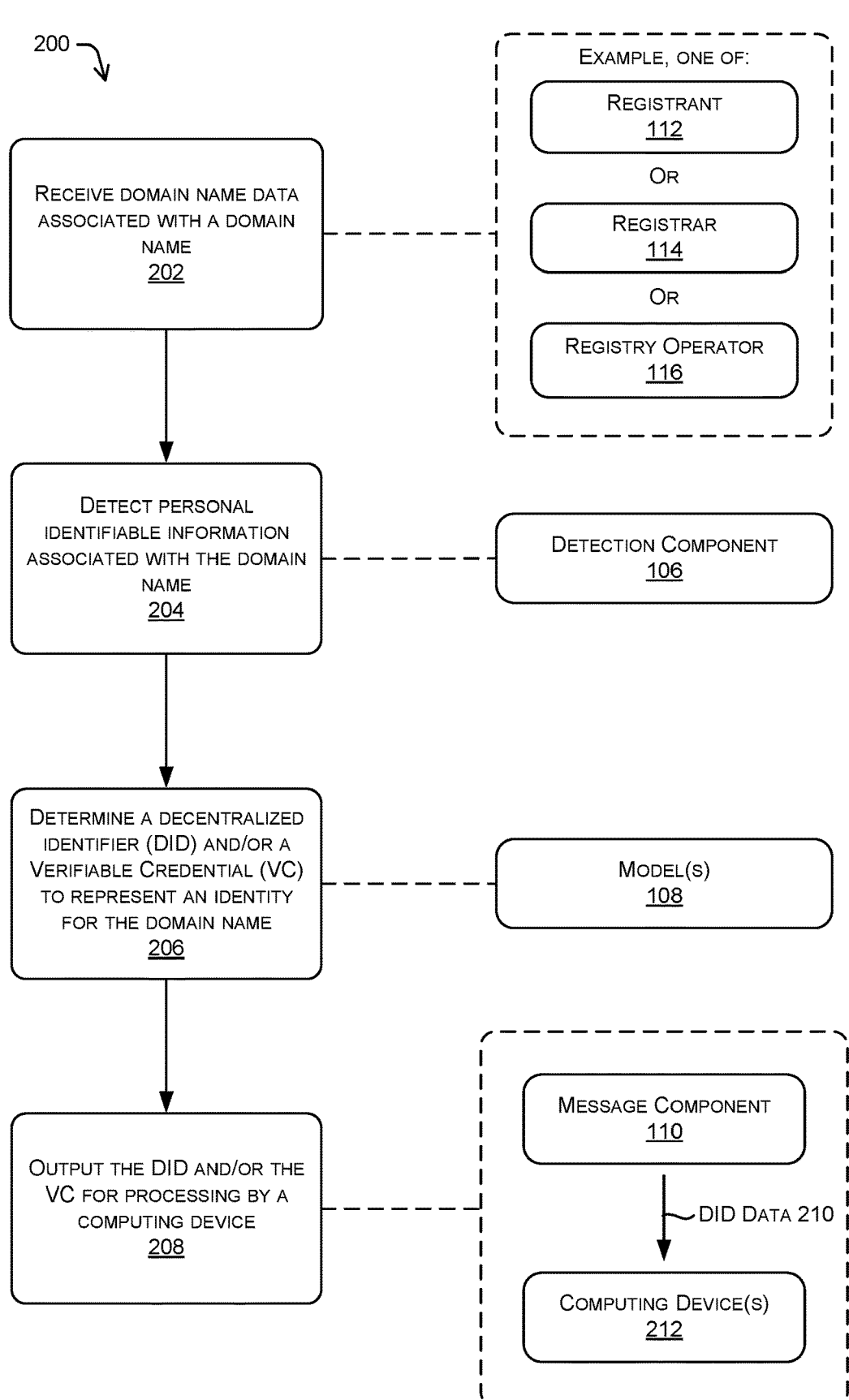
FIG. 2 is a pictorial diagram illustrating an example process by an example computing device to determine a decentralized identifier for a domain name.

FIG. 2 is a pictorial diagram illustrating an example process 200 by an example computing device to determine a decentralized identifier for a domain name. The example process 200 may be implemented by a computing device such as the computing device(s) 104 of FIG. 1.

An operation 202 can include receiving domain name data associated with a domain name. For example, one of: the registrant 112, the registrar 114, or the registry operator 116 can implement the computing device(s) 104 to receive domain name data associated with a message from another entity (another of the registrant 112, the registrar 114, or the registry operator 116). The domain name data can, for example, be included in the message 118 of FIG. 1 and may represent a request for registering or managing a domain name using the decentralized identifier.

In some examples, the domain name data can include a DID, a VC, and/or other identifiers associated with the domain name. For example, the computing device(s) 104 associated with the registrar 114 can receive a DID, the domain name to register, and verifiable credentials showing compliance with registration criteria as required during a domain name registration.

An operation 204 can include detecting personal identifiable information associated with the domain name in the domain name data. For example, the detection component 106 can detect information identifying a person or registered owner of the domain name by parsing a DID document. In some examples, the detection component 106 can parse the message 118 to identify contact information, an address, a human readable name, a phone number, or other personal information that is included in the domain name data.

An operation 206 can include determining a decentralized identifier (DID) and/or a verifiable credential (VC) to represent an identity for the domain name. For example, the model(s) 108 can determine presence of a DID in the domain name data, and further process the DID if present or generate a new DID if not present. For example the model(s) 108 can generate a DID to replace the detected personal identifiable information. In some examples, the model(s) 108 can generate verifiable credentials for association with the DID thereby enabling the DID to act as a unique identifier for the domain name.

An operation 208 can include outputting the DID for processing by a computing device. For example, the computing device 104 can implement the message component 110 to generate a message that includes the DID as part of DID data 210 for sending to a computing device 212. In some examples, the computing device 212 can be associated with one of: the registrant 112, the registrar 114, or the registry operator 116 that received the DID data 210 as part of a DID registration and/or as part of processing a previously generated DID. By way of example and not limitation, the registrar 114 can receive the domain name data as part of operation 202, exchange data with the registry operator 116 as part of DID registration, and output the DID to the computing device(s) 212 associated with registrant 112.

In some examples, the domain name data can be received by a registry operator 116 from the registrar 114. In some examples, the registry operator 116 can store a DID, a verifiable credential, or other information in a registry or other storage device. The registry operator 116 may also or instead receive a DID to associated with a domain name and perform functionality to verify a jurisdiction requirement to register a domain name (e.g., is the domain name owner from the jurisdiction for registering a domain name).

FIG. 3 illustrates an example block diagram of an example computer architecture 300 for implementing techniques to determine a decentralized identifier for a domain name. For example, the computing device(s) 104 can implement one or more of: the detection component 106, the model(s) 108, and the message component 110 to receive input data 302 from an entity 304 and transmit output data 306. The computing device(s) 104 can, for example, receive the input data 302 representing domain name data with a DID, domain name data without a DID, and/or one or more verifiable credentials from the entity 304 (e.g., one of: the registrant 112, the registrar 114, or the registry operator 116).

The computing device(s) 104 can perform different functionality based on the input data 302 and instructions associated therewith. For example, the detection component 106 can determine whether personal data is included in the input data 302 that is subject to regulatory compliance, and substitute or assign a DID to represent the personal data. In examples when the input data 302 includes a DID, the model(s) 108 can modify, update, and/or delete a DID. In some examples, the model(s) 108 can generate, modify, and/or delete a verifiable credential(s) associated with a DID and/or a domain name.

In some examples, the model(s) 108 can, for instance, determine an action associated with the domain name using the decentralized identifier(s) and/or the verifiable credential(s). For instance, the model(s) 108 can validate an identity of the registrant, store data (e.g., DID data) for access by another computing device or third-party that uses the stored data as proof that personal information associated with the registrant is stored safely and properly. In some examples, stored data can be accessed by a computing device to manage an action associated with a DID. By storing the data that includes a DID, less data can be stored relative to storing and managing personal data, resulting in memory and/or processing resources being available for processing.

In various examples, the message component 110 can generate a message that includes the DID for sending to a computing device, such as to provide evidence that the data is stored in accordance with rules by a regulatory entity. Additionally, or alternatively, the message component 110 can determine data for exchanging between two or more of: the registrant 112, the registrar 114, and the registry operator 116. For example, the model(s) 108 can generate the output data 306 that includes a new DID (e.g., in response to receiving a request for a DID), a modified DID or data associated with the DID (e.g., new criteria or instructions associated with the DID), a verifiable credential, or the like. The modified DID can represent, for example, a) a modification to a DID document or b) an addition, removal, or change to a credential associated with the DID (e.g., a DID associated with the computing device(s) 104). In examples when the input data 302 requests a DID to represent the registrant 112, the output data 306 can include a DID generated by the model(s). In some examples, the input data 302 can include a verifiable credential representing a request to verify an identity of the registrant 112, and the output data 306 can include a verification response to the request by including a DID and/or VC.

Figure 4:
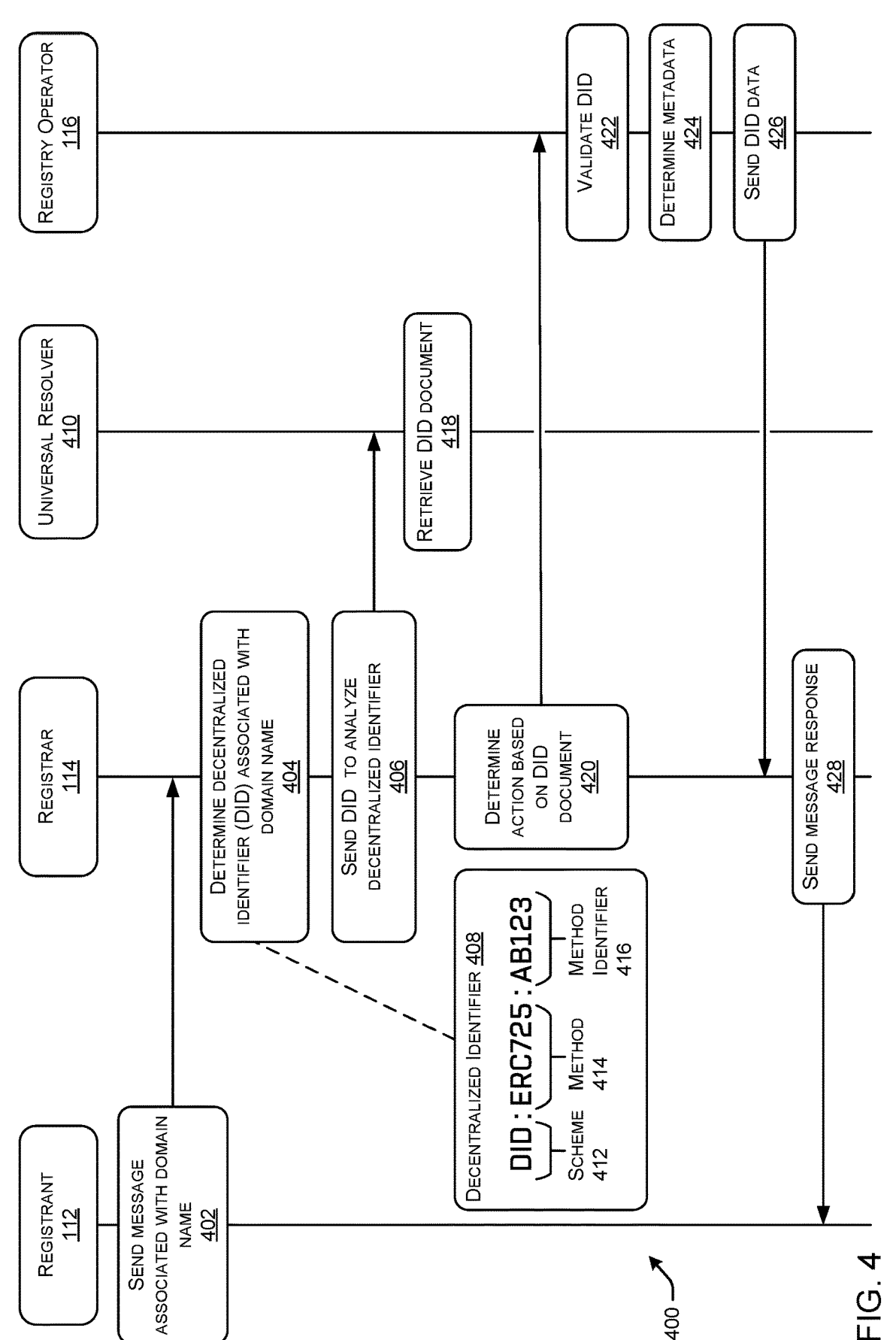
FIG. 4 is a block diagram of an example system for implementing the techniques described herein.

FIG. 4 is a block diagram of an example system 400 for implementing the techniques described herein. For example, the computing device(s) 104 of FIG. 1 can be associated with one or more of: the registrant 112, the registrar 114, and the registry operator 116.

As 402, the registrant 112 can send a message associated with a domain name to the registrar 114. For instance, the registrant 112 can send a request for a new DID, a change to an existing DID (e.g., update or delete a DID), and so on. In some examples, the message can request that a domain name be registered using a DID in place of contact information. Additionally, or alternatively, the message (e.g., the message 118) can request a change to an existing DID. The message may also or instead include a verifiable credential.

At 404, the registrar 114 can determine a decentralized identifier associated with the domain name. For example, the registrar 114 can identify, determine, or generate a DID to associate with the domain name. In some examples, the domain name may already be associated with a DID, and the detection component 106 can identify that the message includes an existing DID for further processing. In other examples, the model(s) 108 can generate a new DID to represent personal information associated with the registrant 112 of the domain name.

At 406, the registrar 114 can send the DID 408 to a universal resolver 410 (e.g., a DIF universal resolver) that included one or more drivers or components corresponding to different decentralized identifier methods. For example, the universal resolver 410 can implement an ERC725 resolution driver, a BTCR resolution driver, a domain name system (DNS) resolution driver, though other driver types are also possible. In some examples, the universal resolver 410 can represent a universal identifier that is configured to identify a driver or component to further process decentralized identifier data.

As shown in FIG. 4, the DID 408 includes a scheme 412, a method 414, and a method identifier 416. In various examples, the detection component 106 can detect the scheme 412 to determine presence of a DID in a message or other data. The DID 408 can include one of a variety of different methods 414 that are associated with instruction that cause various actions. The method 414 can associated with a bitcoin (method=BTCR) or other identity based method that defines who is authorized to act on behalf of the domain name. In various examples, the DID and/or the verifiable credential can be defined in association with World Wide Web Consortium (W3C®).

At 418, the universal resolver 410 retrieves a decentralized identifier document associated with the DID. For example, the universal resolver 410 can convert the DID to a format for accessing the DID document from a database, memory, or other storage device, and receive the DID document based on the request. In some examples, the format for accessing the DID document can vary according to the method 414 associated with the DID 408.

At 420, the registrar 114 can determine an action based at least in part on the DID document provided by the universal resolver 410. In various examples, the universal resolver 410 verifies the validity of the DID document and then returns the document to the requester who can, based on analyzing the DID document, send a message to the registry operator 116 to retrieve data associated with the DID and/or the domain name.

At 422, the registry operator 116 can validate the DID. For example, the registry operator 116 can send a message to a computing device associated with the registrant 112 to approve or reject the action associated with the DID. In examples when the message from the registrant 112 requests to register a domain name using a DID, the registry operator 116 can implement the message component 110 to generate a message for sending to a device (e.g., a mobile phone or other computing device) to validate that the request came from the registrant 112. The registry operator 116 and the device associated with the registrant 112 can exchange data that includes a key, security question, or other validation technique.

At 424, the registry operator 116 can determine metadata associated with the domain name based on the DID. For example, the registry operator 116 can access data from a database based at least in part on validation of the DID. In some examples, the DID document can determine the type of data to access for use as the metadata. For instance, the metadata can include a profile, a permission, an action, a service, a collection, a store, etc. that may be associated with the DID and/or may be stored as a service endpoint.

At 426, the registry operator can send DID data to the registrar. In various examples, the registry operator 116 can transmit the metadata and other data associated with the DID over a network to the registrar 114 (e.g., to enable control of the domain name). At 428, the registrar 114 can send a response to the message received by the registrant at 402. For example, the response can indicate that the DID is usable for representing the registrant 112 and/or the domain name in future data exchanges.

Though FIG. 4 depicts the registrant 112, the registrar 114, the universal resolver 410, and the registry operator 116, in some examples one or more of the registrant 112, the registrar 114, the universal resolver 410, or the registry operator 116 may be excluded (or otherwise be replaced with alternative data, omitted, replaced, and the like). Similarly, the actions performed by registrar 114 may also or instead be performed by registry 116. For example, the techniques described herein can be performed independent of exchanging data with the universal resolver 410 or the registry operator 116.

FIG. 5 is a flowchart depicting an example process 500 for associating a decentralized identifier and a domain name. For example, some or all of the process 500 can be performed by one or more components in FIG. 1, as described herein. For example, some or all of the process 500 can be performed by the computing device(s) 104. In various examples, associating the DID and the domain name enables the identity of the domain name to be verified without requiring the storage or transmission of personal information that is subject to regulatory compliance.

At operation 502, the process may include receiving first data from a registrant requesting an action associated with a domain name. In some examples, the operation 502 may include a computing device associated with the registrar 114 or the registry operator 116 receiving a message from the registrant 112 requesting that the domain name be registered, updated, or processed. In various examples, the action associated with the domain name can include a first action to generate a new decentralized identifier for the domain name, a second action to verify an identity of the registrar 114 to confirm they are authorized to act upon the registrant or domain name, or a third action to generate privacy compliance data associated with the domain name, just to name a few. For example, the registrant 112 can transmit a request to manage the domain name using a decentralized identifier, and the computing device can replace personal information included as part of the first data and/or stored in a database or registry with a decentralized identifier that securely and safely identifies the domain name. The action can include, for instance, associating a verifiable credential with the decentralized identifier.

At operation 504, the process may include determining a decentralized identifier to represent an identity of the registrant. In some examples, the operation 504 may include the detection component 106 identifying an existing DID included in the first data or an existing DID in a registry (e.g., the DID was registered at a previous time). Alternatively, the operation 504 may include the detection component 106 determining or generating a new DID to associate with the domain name. In various examples, the DID can be determined by detecting the DID scheme in the first data, and optionally verifying an identity of the registrant associated with the first data. In some examples, the model(s) 108 can generate the DID to replace or otherwise exclude personal identifiable information in the DID, a registry, a storage device, and the like, based on verifying the identity of the registrant. For example, a DID can represent or otherwise serve in place of, or as a substitute for, personal information (contact information, etc.).

At operation 506, the process may include associating, as second data, the decentralized identifier and the domain name. In some examples, the operation 506 may include the model(s) 108 associating the DID and the domain name as a value, field, or entry in a DID document. The DID document can define the association between the DID and the domain name (e.g., a hash, a key, or other evidence of a secure link). In various examples, associating the DID and the domain name can include the model(s) 108 replacing personal information associated with a memory, storage device, message, or data with the DID to alleviate tracking, storing, or otherwise processing the personal information by one or more devices.

At operation 508, the process may include transmitting the second data to one of: a registrar, a registry operator, or a registrant to cause the action associated with the domain name. In some examples, the operation 508 may include the message component 110 transmitting the second data between the registrar 114 and the registry operator 116 to verify the identity of the registrant 112. The second data can comprise the DID instead of personal information used to register the domain name identified in the DID (e.g., the method identifier 416). In various examples, process 500 may return to 502 after performing operation 508.

Figure 6:
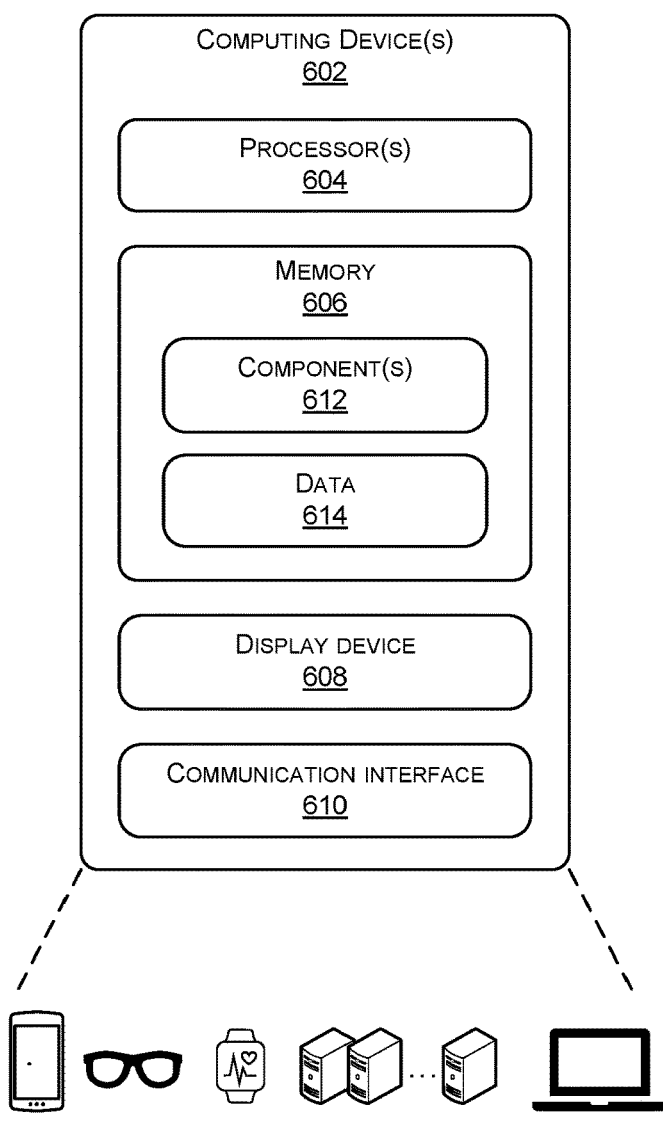
FIG. 6 depicts an example system architecture for an example computing device.

FIG. 6 depicts an example computing device 600 for implementing the techniques described herein. For example, the computing device(s) 602 comprises processor(s) 604, memory 606, a display device 608, and a communication interface 610. As shown in FIG. 6, the memory 606 comprises one or more components 612 and data 614. In some examples, the computing device(s) 602 can be configured to perform the functionality of the computing device(s) 104.

The processor(s) 604 can be any suitable processor capable of executing instructions to process data and perform operations as described herein. By way of example and not limitation, the processor(s) 604 can comprise one or more Central Processing Units (CPUs), Graphics Processing Units (GPUs), Tensor Processing Units (TPUs), or any other device or portion of a device that processes electronic data to transform that electronic data into other electronic data that can be stored in registers and/or memory. In some examples, the processor(s) can represent a Redundant Array of Inexpensive Disk drives (RAID) configuration. In some examples, integrated circuits (e.g., ASICs, etc.), gate arrays (e.g., FPGAs, etc.), and other hardware devices configured to implement encoded instructions can also be considered processors. In various examples, the processor(s) 604 can be communicatively coupled to the memory 606 and be configured to execute instructions stored on or otherwise associated with the memory 606 to implement the techniques described herein.

In various examples, the memory 606 can include system memory, which may be volatile (such as RAM), non-volatile (such as ROM, flash memory, etc.) or some combination of the two. The memory 606 can also or instead include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by the computing device(s) 602.

The memory 606 can store one or more components 612 and/or data 614 represent an operating system, a software application, instruction, program, and/or data to implement the methods described herein and the functions attributed to the various systems. The architectures, systems, and individual elements described herein can include many other logical, programmatic, and physical components, of which those shown in the accompanying figures are merely examples that are related to the discussion herein. In some examples, the memory can represent an Error-Correcting Code (ECC) memory hardware device, or other storage device.

A display device 608 can represent an output device capable of presenting information for display. For example, the display device 608 can represent a liquid crystal display, a touch-sensitive display, a peripheral display, or other device for presenting data associated with a domain name.

The communication interface 610 can represent functionality to communicatively couple the computing device(s) 602 to a network, such as the network 120 of FIG. 1 to enable an exchange of data with another commuting device. In various examples, the communication interface 610 can include a physical network interface, such as a network adapter, communication device, transceiver, modems interfaces, antenna, or the like. The communications interface 610 can also or instead include logical interfaces for connecting the computing device(s) 602 to another computing device or one or more external networks (e.g., the Internet). For example, the communications interface 610 can enable Wi-Fi-based communication such as via frequencies defined by the IEEE 802.11 standards, short range wireless frequencies such as Bluetooth, cellular communication (e.g., 2G, 3G, 4G, 4G LTE, etc.), satellite communication, dedicated short-range communications (DSRC), or any suitable wired or wireless communications protocol that enables the respective computing device to interface with the other computing device(s).

The component(s) 612 can represent the detection component 106, the model(s) 108, and/or the message component 110, just to name a few. Generally, the component(s) 612 can represent functionality implemented by the computing device(s) 602 to perform or enable performing any action taken by the computing device(s) 602. The data 614 can include a platform, an operating system, an application, and/or other information (e.g., a decentralized identifier, a verifiable credential, etc.).

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes examples having specific structural features and/or methodological acts, it is to be understood that the claims are not necessarily limited to the specific features or acts described. Rather, the specific features and acts are merely illustrative of some examples that fall within the scope of the claims of the application.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. In some examples, one or more operations of the method may be omitted entirely. For example, and without limitation, the operation 208 of FIG. 2 and/or the operation 508 of FIG. 5 (and/or other operations) can be omitted from the respective processes. Moreover, the methods described herein can be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

What is claimed is:

1. A computer-implemented method comprising:

receiving, by a registrar, a first data from a registrant requesting an action associated with a domain name maintained in a registry by a domain name system registry operator for the domain name, wherein the domain name system registry operator is configured to maintain the registry of domain names associated with a domain;

determining, by the registrar, a decentralized identifier to represent personal identifiable information of the registrant, wherein determining the decentralized identifier to represent the personal identifiable information of the registrant comprises:

determining that the domain name included in the first data is associated with the personal identifiable information; and generating, by the registrar, the decentralized identifier;

determining a second data based on the decentralized identifier and the domain name, the second data excluding the personal identifiable information of the registrant; and outputting the second data to the domain name system registry operator to verify an identity of the registrant.

2. The computer-implemented method of claim 1, wherein:
- the first data identifies a decentralized identifier method included as part of the decentralized identifier.

3. The computer-implemented method of claim 1, wherein determining the decentralized identifier further comprises:
- determining that the domain name is not associated with a previously generated decentralized identifier; and
- generating the decentralized identifier responsive to determining that the domain name is not associated with the previously generated decentralized identifier.

4. The computer-implemented method of claim 1, wherein determining the decentralized identifier comprises:
- determining that the domain name is associated with a previously generated decentralized identifier; and
- accessing the previously generated decentralized identifier for output as the decentralized identifier.

5. The computer-implemented method of claim 1, further comprising:
- configuring one or more verifiable credentials to include as part of the second data.

6. The computer-implemented method of claim 5, the computer-implemented method further comprising:
- outputting, to the registrant, a combination of the one or more verifiable credentials and the decentralized identifier to meet domain name registration criteria.

7. The computer-implemented method of claim 1, further comprising:
- transmitting the decentralized identifier to the registrant to enable control of the domain name.

8. The computer-implemented method of claim 1, wherein the registrant is a first registrant, and the computer-implemented method further comprising:
- transmitting at least a portion of the second data to a second registrant to enable the second registrant to identify the first registrant.

9. One or more non-transitory computer-readable media storing instructions that, when executed, cause one or more processors to perform operations comprising:
- receiving, by a registrar, a first data from a registrant requesting an action associated with a domain name maintained in a registry by a domain name system registry operator for the domain name, wherein the domain name system registry operator is configured to maintain the registry of domain names associated with a domain;
- determining, by the registrar, a decentralized identifier to represent personal identifiable information of the registrant, wherein determining the decentralized identifier to represent the personal identifiable information of the registrant comprises:
  - determining that the domain name included in the first data is associated with the personal identifiable information; and
  - generating, by the registrar, the decentralized identifier;
- determining a second data based on the decentralized identifier and the domain name, the second data excluding the personal identifiable information of the registrant; and
- outputting the second data to the domain name system registry operator to verify an identity of the registrant.

10. The one or more non-transitory computer-readable media of claim 9, the operations further comprising:
- configuring a verifiable credential to include as part of the second data.

11. The one or more non-transitory computer-readable media of claim 9, wherein determining the decentralized identifier to represent the identity personal identifiable information of the registrant further comprises:
- verifying the identity of the registrant based at least in part on the first data;
- wherein determining that the domain name included in the first data is associated with the personal identifiable information is based at least in part on verifying the identity;
- wherein generating the decentralized identifier comprises generating the decentralized identifier to replace the personal identifiable information of the registrant.

12. The one or more non-transitory computer-readable media of claim 9, wherein determining the decentralized identifier and the domain name comprises:
- adding the second data representing the decentralized identifier and the domain name to a decentralized identifier document; and
- storing the decentralized identifier document to manage the action associated with the domain name.

13. The one or more non-transitory computer-readable media of claim 9, wherein the action associated with the domain name comprises one of:
- a first action to generate a new decentralized identifier for the domain name,
- a second action to verify the identity of the registrar, or
- a third action to generate privacy compliance data associated with the domain name.

14. A system comprising:
- one or more processors; and
- one or more non-transitory computer-readable media storing instructions executable by the one or more processors, wherein the instructions, when executed, cause the one or more processors to perform operations comprising:
  - receiving, by a registrar, a first data from a registrant requesting an action associated with a domain name maintained in a registry by a domain name system registry operator for the domain name, wherein the domain name system registry operator is configured to maintain the registry of domain names associated with a domain;
  - determining, by the registrar, a decentralized identifier to represent personal identifiable information of the registrant, wherein determining the decentralized identifier to represent the personal identifiable information of the registrant comprises:
    - determining that the domain name included in the first data is associated with the personal identifiable information; and
    - generating, by the registrar, the decentralized identifier;
  - determining a second data based on the decentralized identifier and the domain name, the second data excluding the personal identifiable information of the registrant; and
  - outputting the second data to the domain name system registry operator to verify an identity of the registrant.

15. The system of claim 14, the operations further comprising:
- configuring a verifiable credential to include as part of the second data.

16. The system of claim 14, wherein determining the decentralized identifier comprises:

adding the second data representing the decentralized identifier and the domain name to a decentralized identifier document; and storing the decentralized identifier document to manage the action associated with the domain name.

17. The system of claim 14, wherein the action associated with the domain name comprises one of:

a first action to generate a new decentralized identifier for the domain name, a second action to verify the identity of the registrar, or a third action to generate privacy compliance data associated with the domain name.

18. The system of claim 14, wherein determining the second data based on the decentralized identifier and the domain name comprises associating the decentralized identifier and the domain name in a decentralized identifier document.

19. The system of claim 14, the operations further comprising:

defining an association between the decentralized identifier and the domain name in a decentralized identifier document.

20. The system of claim 14, wherein:

the first data identifies a decentralized identifier method included as part of the decentralized identifier.

\* \* \* \* \*